(12) United States Patent
Goto (10) Patent No.: US 6,402,491 B1
(45) Date of Patent: Jun. 11, 2002

(54) CURING MACHINE FOR PNEUMATIC TIRES

(75) Inventor: Tomotaka Goto, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/520,791

(22) Filed: Mar. 8, 2000

(30) Foreign Application Priority Data

Mar. 16, 1999 (JP) ............................................. 11-070353
Feb. 15, 2000 (JP) ........................................ 2000-036263

(51) Int. Cl.$^7$ ............................................. B29C 35/02
(52) U.S. Cl. ........................................... 425/48; 425/58
(58) Field of Search .............................. 425/48, 58, 43, 425/52

(56) References Cited

U.S. PATENT DOCUMENTS

| | | | |
|---|---|---|---|
| 4,872,822 A | 10/1989 | Pizzorno | 425/48 |
| 5,522,716 A | 6/1996 | Ureshino | 425/48 |
| 5,853,526 A | 12/1998 | Laurent et al. | 425/48 |

FOREIGN PATENT DOCUMENTS

| | | |
|---|---|---|
| EP | 0 529 331 A1 | 3/1993 |
| JP | 63-288719 A * | 11/1988 ................. 425/383 |
| JP | 4-146107 A * | 5/1992 |

* cited by examiner

Primary Examiner—Nam Nguyen
Assistant Examiner—Thu Khanh Nguyen
(74) Attorney, Agent, or Firm—Oliff & Berridge, PLC

(57) ABSTRACT

A curing machine for pneumatic tires includes a bladder which is tightly held by upper and lower bladder rings, a vertically movable center post for holding the upper bladder ring, and an outer cylinder arranged on a radially outer side of the center post, for supplying a pressurized heat medium into the interior of a green tire. An upper lock mechanism is associated with the top end portion of the center post and serves to automatically lock the upper bladder ring in place by after the top end portion of the center post has been moved upwards and passed through a center through hole in the upper bladder ring. A lower lock mechanism serves to automatically lock and unlock the lower bladder ring, in which a lock region extending downwards from the lower bladder ring is engaged with, and disengaged from a first lock member secured to the outer cylinder by vertically moving a second lock member in opposite directions. The upper and lower lock mechanisms can be operated simultaneously, so that the exchange of the bladders can be performed highly efficiently, in a simplified and within a minimized time.

29 Claims, 9 Drawing Sheets

CURING MACHINE FOR PNEUMATIC TIRES

BACKGROUND OF THE INVENTION

1. Field of the Invention

The present invention relates to a curing machine for pneumatic tires wherein the exchange of the bladders can be performed highly efficiently, in a simplified manner and within a minimized time.

2. Description of Related Art

As generally known in the art, curing machine for pneumatic tires includes a bladder for heating and pressurizing a green tire from its inner side, to thereby perform curing of the green tire and obtain a product tire. The bladder is detachably held by upper and lower bladder rings of the curing machine in air tight manner. To this end, it has been a conventional practice that a pair of upper bladder rings are connected to each other by screws so as to clamp the upper surface of the bladder therebetween, and a pair of lower bladder rings are similarly connected to each other by screws so as to clamp the lower surface of the bladder therebetween, thereby forming a bladder assembly. The curing machine further includes a vertically movable center post for holding the upper bladder rings, which is provided with a threaded top end portion and a flange-like collar on the lower side of the top end portion. An outer cylinder is arranged on the radially outer side of the center post, for supplying a pressurized heat medium into an interior of the green tire. The outer cylinder is also provided with a threaded top end portion. The upper bladder ring has a center through hole through which the threaded top end portion of the center post can be passed. The lower bladder ring has a threaded center hole which can be fastened to the threaded top end portion of the outer cylinder.

In order to mount a bladder onto the curing machine, the top end portion of the center post is passed through the center through hole of the upper bladder ring so as to suspend the bladder assembly. The threaded center hole of the lower bladder ring is then aligned with the threaded top end portion of the outer cylinder and fastened thereto by rotating the entire bladder assembly about the center axis of the outer cylinder. Subsequently, a nut is fastened to the threaded top portion of the center post to complete the mounting operation of the bladder assembly onto the curing machine.

In order to remove the bladder assembly from the curing machine, the above-mentioned steps are reversed. Thus, the nut is disengaged from the top end portion of the center post, and the bladder assembly as a whole is then rotated about the center axis of the outer cylinder to disengage the lower bladder ring from the outer cylinder, thereby allowing removal of the bladder assembly from the curing machine.

The above-mentioned mounting and removing operations of the bladder assembly to and from the curing machine is troublesome and time consuming, so that it has been difficult to improve the working efficiency and manufacturing productivity. Moreover, it is a general practice that tire factory is in full operation, i.e., 24 hours a day, and a curing machine is used to produce various tires with different specifications, thereby requiring changes to the curing mold and bladder assembly. The curing of tires is performed using high temperature gas, and the curing machine has substantial heat capacity. Thus, the interior of the machine immediately after it has been operated exhibits a high temperature so that the factory workers are exposed to a severe working environment for a long time. It is highly desirable to improve the working environment at tire factories, and it is highly important in this respect to ensure that exchange of the bladders can be performed highly efficiently, in a simplified manner and within a minimized time.

SUMMARY OF THE INVENTION

It is therefore a primary object of the present invention to provide an improved curing machine which allows the bladders to be exchanged highly efficiently, in a simplified manner and within a minimized time.

According to a first aspect of the present invention, there is provided a curing machine for pneumatic tires, comprising: a bladder for heating and pressurizing a green tire from its inner side; upper and lower bladder rings for holding a bladder in air-tight manner, said upper bladder ring having upper and lower surfaces and a center through hole; a vertically movable center post for holding said upper bladder ring, said center post having a top end portion which can be passed through said center through hole in the upper bladder ring; and an upper lock mechanism associated with the top end portion of the center post for automatically locking the upper and lower surfaces of the upper bladder ring to the center post after the top end portion of the center post has been passed through the center through hole in the upper bladder ring.

According to a second aspect of the present invention, there is provided a curing machine for pneumatic tires, comprising: a bladder for heating and pressurizing a green tire from its inner side; upper and lower bladder rings for holding a bladder in air-tight manner, a vertically movable center post for holding said upper bladder ring; an outer cylinder arranged on a radially outer side of the center post, for supplying a pressurized heat medium into an interior of the green tire; a lower lock mechanism for locking the lower bladder ring to the outer cylinder, said lower lock mechanism comprising: (i) a lock region extending downwards from the lower bladder ring; (ii) a first lock means secured to an outer side of the outer cylinder; and (iii) a second lock mechanism which can be vertically moved on an outer side of the first lock means so that the first lock means is engaged with the lock region of the lower bladder ring and locked with each other by vertically moving the second lock means in a predetermined direction, and unlocked from each other by vertically moving the second lock means in the opposite direction.

According to a third aspect of the present invention, there is provided a curing machine for pneumatic tires, comprising: a bladder for heating and pressurizing a green tire from its inner side; upper and lower bladder rings for hold a bladder in air-tight manner, said upper bladder ring having a center through hole; a vertically movable center post for holding said upper bladder ring, said center post having a top end portion which can be passed through said center through hole in the upper bladder ring; an outer cylinder arranged on a radially outer side of the center post, for supplying a pressurized heat medium into an interior of the green tire; an upper lock mechanism associated with the top end portion of the center post for automatically locking the upper bladder ring to the center post after the top end portion of the center post has been passed through the center through hole in the upper bladder ring; and a lower lock mechanism for locking the lower bladder ring to the outer cylinder, said lower lock mechanism comprising: (i) a lock region extending downwards from the lower bladder ring; (ii) a first lock means secured to an outer side of the outer cylinder; and (iii) a second lock means which can be vertically moved on an outer side of the first lock means so that the first lock means is engaged with the lock region of the lower bladder ring and locked with each other by vertically moving the second lock means in a predetermined direction, and unlocked from each other by vertically moving the second lock means in opposite direction.

BRIEF DESCRIPTION OF THE DRAWINGS

The present invention will be explained below in further detail, with reference to the preferred embodiments shown in the drawings, in which.

DETAILED DESCRIPTION OF THE PREFERRED EMBODIMENTS

Referring now to FIGS. 1 to 5, there is shown a pneumatic tire curing machine according to a preferred embodiment of the present invention, including a cylindrical center post 1 which can be moved vertically upwards or downwards in operation of the machine, upper and lower bladder rings 2, 3 which are held by the center post 1, a bladder 4 which is clamped by the upper and lower bladder rings, 2, 3 in air-tight manner, and a stationary outer cylinder 5 which is in sliding engagement with the center post 1. The bladder 4 serves to pressurize and heat a green tire (not shown) from its inner side, in a conventional manner. To this end, the curing machine includes a passage 21 for supplying a high temperature pressurized gas, such as nitrogen gas or steam, and a passage 22 which is arranged within the outer cylinder 5 and connected between the passage 21 and the interior of the green tire.

Figure 1:
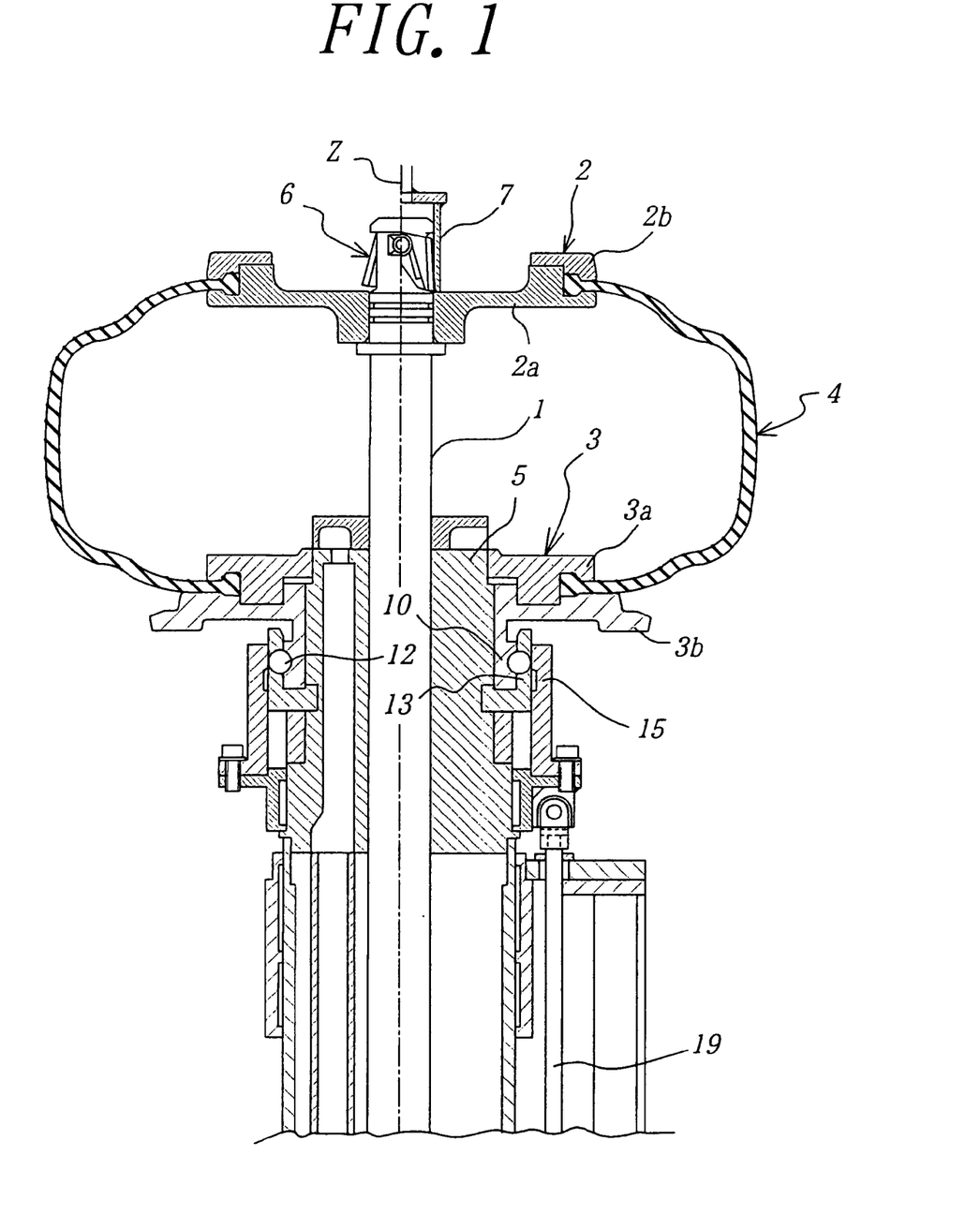
FIG. 1 is a sectional view showing the arrangement around the center post of the curing machine according to one embodiment of the present invention.

As shown in FIG. 1, the upper bladder ring 2 comprises a pair of ring elements 2a, 2b which can be connected with, and separated from each other with the inner peripheral portion of the bladder 4 on its upper side. Similarly, the lower bladder ring 3 comprises a pair of ring elements 3a, 3b which can be connected with, and separated from each other with the inner peripheral portion of the bladder 4 on its lower side.

The center post 1 has a flange-like collar 1—1 at its upper portion, from which a top end portion 1–2 projects upwards. The collar 1—1 has an upper surface which serves to support the ring element 2a thereon. The top end portion 1–2 includes a sliding region 1–2a which is in sliding contact with the inner surface of the center hole 2ah of the ring element 2a, and a top end region 1–2b which extends upwards beyond the ring element 2a. The top end region 1–2b is smaller in diameter than the sliding region 1–2a, and provided with an upper lock mechanism 6.

Figure 2:
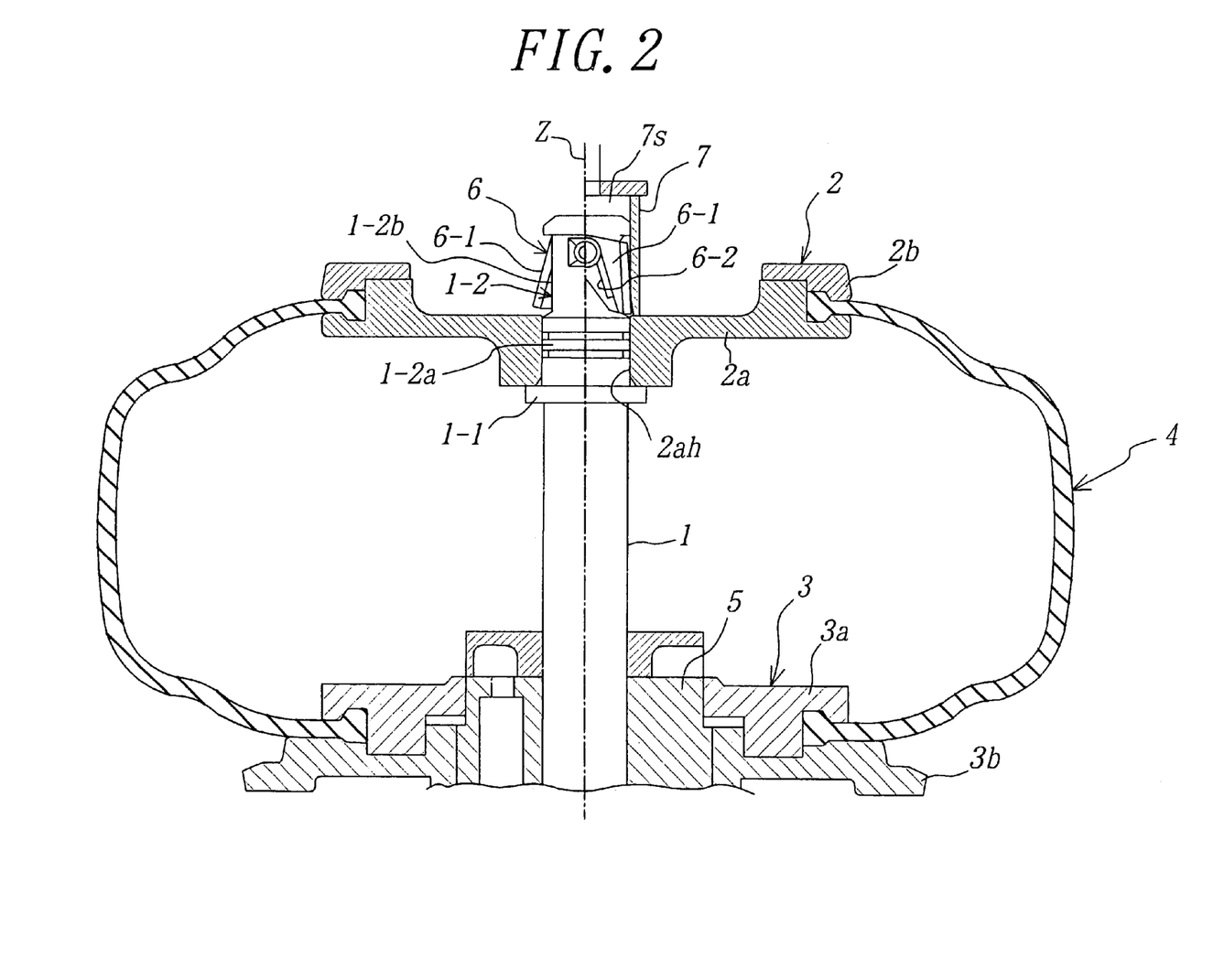
FIG. 2 is a sectional view showing the upper lock mechanism of the curing machine of FIG. 1.

The upper lock mechanism 6 includes a plurality of swing arms 6–1 which are oriented vertically downwards and biased by respective resilient members 6–2 toward their neutral positions in which they are expanded radially outwards. As will be explained hereinafter, the swing arms 6–1 can be retracted radially inwards, against the biasing force of the resilient members 6–1. The proximal ends of the swing arms 6–1 are pivotally secured to the outer surface of the center post 1 at the top end region 1–2b, with their swing axes extending horizontally and radially outwards from the center post 1. The free ends of the swing arms 6–1 serve to urge the top surface of the upper bladder ring 2 when they are in expanded radially outwards toward their neutral positions.

It is preferred that the resilient members 6–2 are comprised of torsion coil springs. In this instance, each coil spring 6–2 is wound over the pivot at the proximal end of the swing arm 6–1, with its one end anchored by the center post 1. Another end of the coil spring 6–2 is in the form of a linear extension which is engaged with the inner surface of the swing arm 6–1 so as to bias the swing arm 6–1 toward its neutral position in which it is expanded radially outwards.

The angular range in which the swing arm 6–1 undergoes a swinging motion may be small, provided that the free end of the swing arm 6–1 in its expanded position exerts a sufficient pressure onto the top surface of the upper bladder ring 2. In order that a sufficient pressure can be adequately exerted by the swing arm 6–1 onto the upper bladder ring 2, it is preferred that the top surface of the upper bladder ring 2 at the periphery of the center hole 2ah is in the form of a concave surface toward the upper side. In this instance, the concave surface of the upper bladder ring 2 has a radius of curvature which is designed in consideration of the effective length of the swing arm 6–1, or the trajectory which is circumscribed by the free end of the swing arm 6–1 during its angular movement.

As shown in the right halves of FIGS. 1 and 2, the curing machine according to the present invention further includes an unlock member 7 which is situated immediately above the center post 1. The unlock member 7 is aligned with the center post 1 to have a common center axis Z, and movable vertically upwards or downwards by an appropriate actuator, not shown, such as pneumatic or hydraulic cylinder/piston device.

It is preferred that the unlock member 7 is in the form of an inverted cup and has a substantially cylindrical inner space 7s. The inner space 7s of the unlock member 7 is capable of accommodating the swing arms 6–1 of their entirety or at least upper portions thereof, as the unlock member 7 is moved from the upper position (not shown) to the illustrated lower position and the swing arms 6–1 are thereby forcedly retracted radially inwards against the biasing force of the torsion coil springs 6–2.

It is assumed that, when the swing arms 6–1 are retracted radially inwards and accommodated in the inner space 7s of the unlock member 7, the swing arms 6–1 are disengaged from the top surface of the upper bladder ring 2 and circumscribe a circle about the center axis Z of the center post 1, having a diameter which is smaller than the inner diameter of the center hole 2ah in the ring element 2a.

In order to firmly hold the upper bladder ring 2 by the upper lock mechanism 6, the center post 1 is moved upwards so that the top end portion of the center post 1 is passed through the center hole 2ah in the ring element 2a, together with the swing arms 6–1. Assuming that the unlock member 7 is maintained at its upper position in which it is vertically spaced upwards from the upper bladder ring 2, the swing arms 6–1 as biased by the torsion coil spring 6–2 are automatically expanded radially outwards as soon as the free ends of the swing arms 6–1 have passed through the center hole 2ah in the ring element 2a. The free ends of the swing arms 6–1 are then brought into abutment with, and urged against the surface of the upper bladder ring 2 at the periphery of the center hole 2ah. In this instance, the swing arms 6–1 cooperate with the flange-like collar 1—1 of the center post 1 to tightly hold the upper bladder ring 2 therebetween.

Thus, the above-mentioned arrangement of the upper lock mechanism 6 makes it possible readily to mount the upper bladder ring 2 onto the curing machine within a minimized time, in a highly accurately centered position, simply by moving the center post 1 upwards and thereby passing the top end portion 1–2 of the center post 1 through the center hole 2ah in the ring element 2a, together with the swing arms 6–1.

When, on the other hand, the upper bladder ring 2 is to be removed from the curing machine, the unlock member 7 is moved downwards to its lower position so that the swing arms 6–1 are forcedly retracted radially inwards against the biasing force of the torsion coil springs 6–2. The swing arms 6–1 are thereby disengaged from the top surface of the upper bladder ring 2 and accommodated in the inner space 7s of the unlock member 7. The center post 1 is then moved downwards until the top end region 1–2 of the center post 1 is passed through, and removed from the center hole 2ah of the upper bladder ring 2 together with the swing arms 6–1 so that the upper bladder ring 2 is released from the upper lock mechanism 6.

Thus, the above-mentioned arrangement of the upper lock mechanism 6 in combination with the unlock member 7 makes it possible readily to remove the upper bladder ring 2 from the curing machine within a minimized time, simply by moving the unlock member 7 downwards to its lower position and successively moving the center post 1 downwards and thereby passing the top end portion 1–2 of the center post 1 through the center hole 2ah in the ring element 2a, together with the swing arms 6–1.

Figure 3:
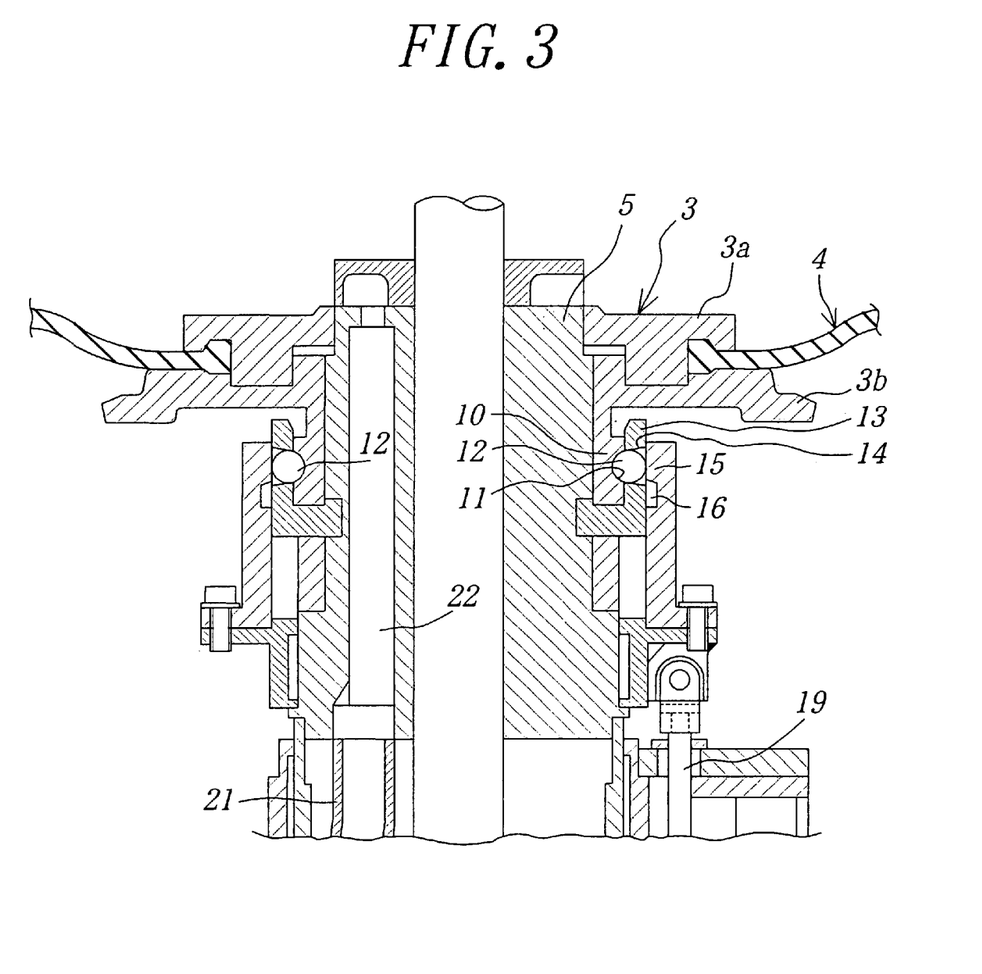
FIG. 3 is a sectional view showing the lower lock mechanism of the curing machine of FIG. 1, wherein the lower lock mechanism assumes a locking state.
Figure 4:
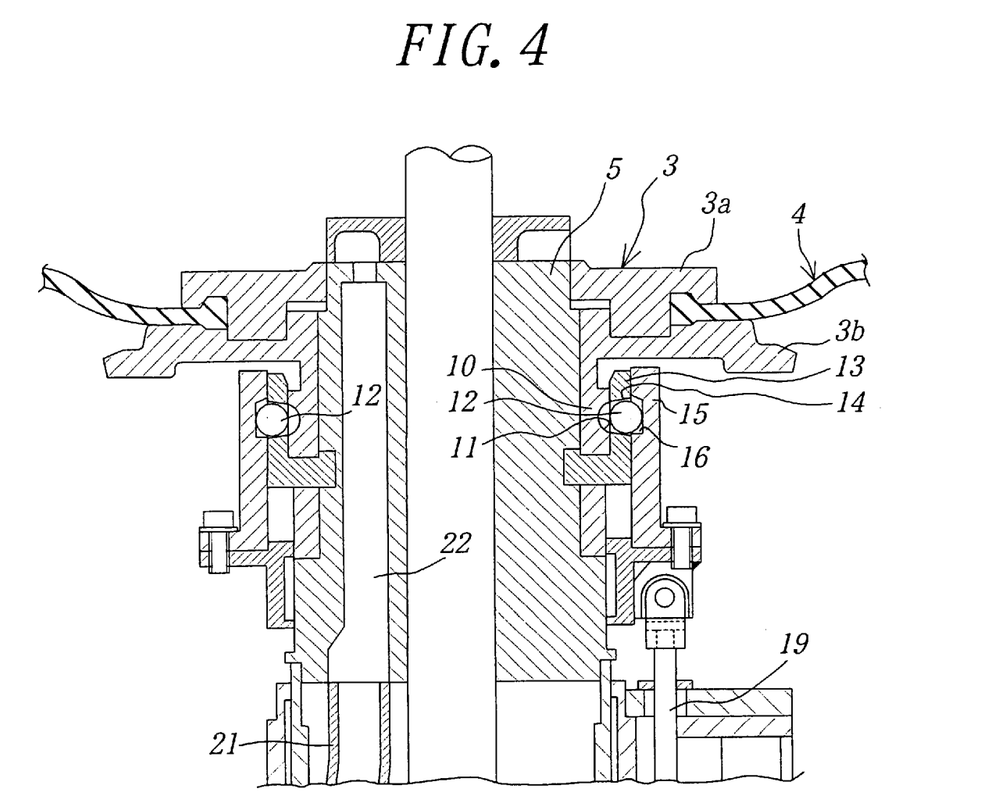
FIG. 4 is a sectional view similar to FIG. 3, but showing the lower lock mechanism in an unlocking state.
Figure 5:
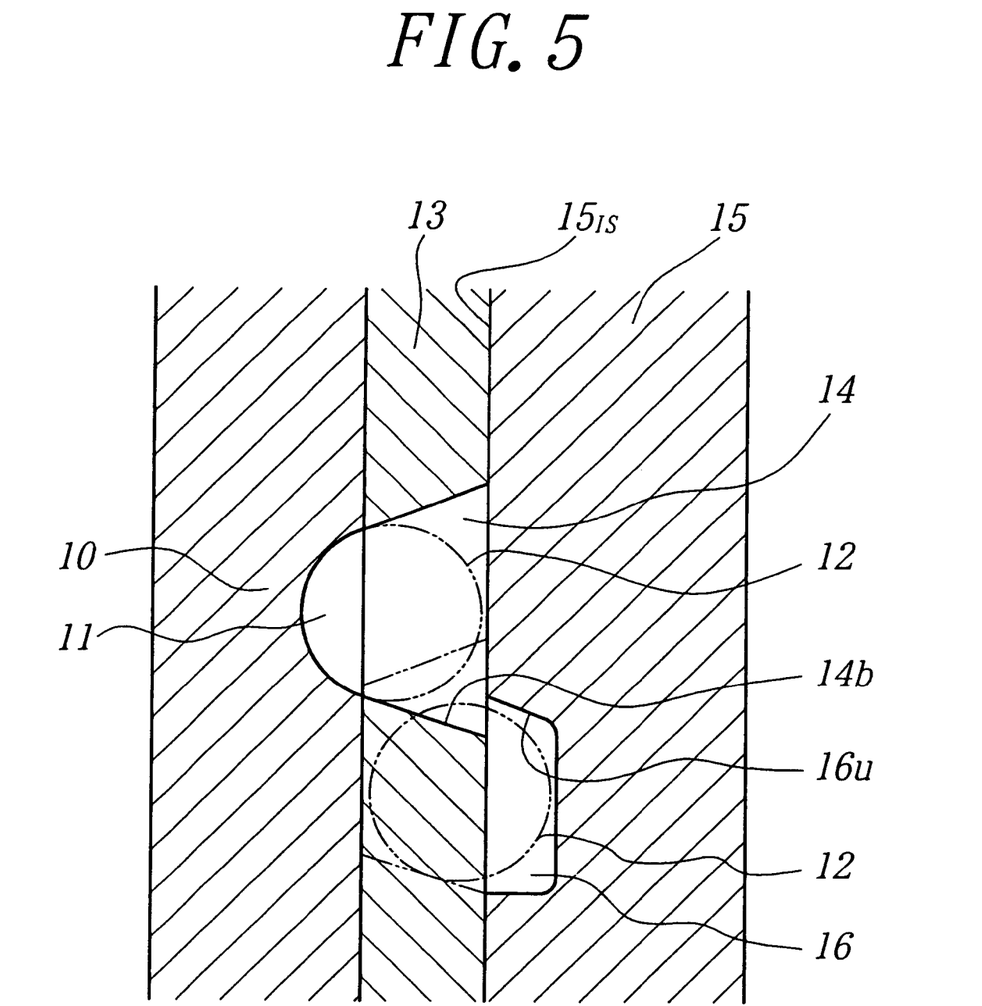
FIG. 5 is a sectional view explaining the operation of the lower lock mechanism of FIG. 3 in enlarged scale.

Turning to FIGS. 3 to 5, the lower ring element 3b of the lower bladder ring 3 has a center hole which is in sliding engagement with the outer cylinder 5, and a cylindrical portion extending downwards along the outer cylinder 5. The cylindrical portion of the lower ring element 3b has a lock region 10 on its outer side, where the lower bladder ring 3 is locked by a lower lock mechanism to be described below.

The lock region 10 of the lower ring element 3b is formed in its outer surface with a plurality of recesses 11 spaced from each other in the circumferential direction, wherein each recess has a part-spherical shape corresponding to a ball 12. Alternatively, however, the lock region 10 may be formed in its outer surface with a circumferential groove 11 having an arcuate cross-sectional contour corresponding to part of the bass 12.

A substantially cylindrical first lock member 13 is fixedly secured to the outer side of the outer cylinder 5. A space is formed between the first lock member 13 and the outer cylinder, which serves to accommodate the lock region 10 of the lower ring element 3b as it is moved downwards. The first lock member 13 is formed with a plurality of through-holes 14 at locations corresponding to the circumferential groove or recesses 11 at the lock region 10 of the lower ring element 3b. A plurality of balls 12 are retained in the respective through-holes 14, each having a diameter which is larger than the thickness of the lock member 13. Thus, the balls 12 retained in the through-holes 14 are partly received in the respective recesses 11 at the lock region 10 of the lower ring element 3b.

A substantially cylindrical second lock member 15 is arranged on the outer side of the first lock member 13. The second lock member 15 is vertically movable in sliding engagement with the first lock member 13. The second lock member 15 is formed with a plurality of recesses 16 having a shape which is suitable for partly receiving the ball 12 retained by the through-hole 14 in the first lock member 13.

With reference to FIGS. 3 and 5, when the second lock member 15 is in its lower position, the balls 12 retained in the through-holes 14 in the first lock member 13 are partly received in the recesses 11 and prevented by the inner surface $15_{1S}$ of the second lock member 15 from being moved radially outwards from the recesses 14 of the first lock member 13. The lock region 10 of the lower bladder ring 3b is thus locked by the first lock member 13, with the balls 12 retained in the through-holes 14 in the first lock member 13 and partly received in the recesses 11 at the lock region 10.

When the second lock member 15 is in its upper position, as shown in FIG. 4, the recesses 16 in the second lock member 15 are aligned with the respective through-hole 14 in the first lock member 13. It can be seen from FIG. 5 that each through-hole 14 has a bottom surface 14b which is inclined downwards and radially outwards.

Referring to FIGS. 4 and 5, when the second lock member 15 assumes the upper position, because the recesses 16 in the second lock member 15 are aligned with the respective through-holes 14 in the first lock member 13 are mentioned above, the balls 12 are allowed to automatically roll over the bottom surfaces 14b of the respective through-holes radially outwards. As a result, each ball 12 is completely disengaged from the recess 11 in the lock region 10 of the lower bladder ring 3 and partly engaged into the recess 16 in the second lock member 15. Thus, the lock region 10 of the lower bladder ring 3 is completely released from the first lock member 13.

As shown in FIGS. 1, 3 and 4, the second lock member 15 is moved vertically upwards and downwards by an actuator, not shown, which is arranged on the lower side of the curing machine and connected to the second lock member 15 through a connecting rod 19. If the actuator can be arranged adjacent to the second lock member 15, they can be directly connected to each other and the connecting rod 19 can be omitted.

It is important that the balls 12 can withstand the operating temperature of the curing machine which is as high as approximately 200° C. The balls 12 are typically comprised of appropriate metal, such as steel. Alternatively, however, the balls 12 may be comprised of a thermosetting-type synthetic resin having a low frictional resistance.

It is noted that the lower lock mechanism is comprised of the recesses 11 in the lock region 10 of the lower ring element 3b, the through-holes 14 in the first lock member 13, the recesses 16 in the second lock member 15, and the balls 12 normally retained in the through holes 14 in the first lock member 13 so as to be movable between the lock position in which they are partly received in the recesses 11 of the lock region 10, and the unlock position in which they are disengaged from the recesses 11 of the lock region 10 and partly received in the recesses 16 of the second lock member 15.

When the lower bladder ring 3 is to be mounted onto the curing machine and firmly held by the lower lock mechanism, in the first instance, the second lock member 15 is maintained in its upper position. Subsequently, the lock region 10 of the lower bladder ring 3 is moved downwards along the outer cylinder 5 and inserted into the space between the outer cylinder 5 and the first lock member 13. The second lock member 15 is then moved downwards by the actuator to its lower position so that the balls 12 retained by the through-holes 14 in the first lock member 13 are forcedly disengaged from the recesses 16 in the second lock member 15 and partly engaged into the recesses 11 in the lock region 10 of the lower bladder ring 3. In this instance, as mentioned above, the disengagement of the balls from the recesses 11 in the lock region 10 is prevented by the inner surface of the second lock member $15_{1S}$.

In this way, it is possible to readily mount the lower bladder ring 3 onto the curing machine within a minimized time, and firmly hold the lower bladder ring 3 in a highly accurately center position by the lower lock mechanism. The upper and lower bladder rings, 2, 3 can be simultaneously mounted onto the curing machine and are locked in place automatically. Therefore, the bladder 4 can be mounted onto the curing machine highly efficiently, within a minimized time and in a facilitated manner.

When, on the other hand, the lower bladder ring 3 is to be removed from the curing machine, the second lock member 15 is moved upwards by the actuator to its upper position in which the recesses 16 in the second lock member 15 are aligned with the through-holes 14 in the first lock member 13. The balls 12 are now allowed to automatically roll over the bottom surfaces 14b of the respective through-holes 14 radially outwards, and are completely disengaged from the recesses 11 in the lock region 10 of the lower bladder ring 3 and engaged partly into the recesses 16 in the second lock member 15, with the result that the lock region 10 of the lower bladder ring 3 is automatically released from the first lock member 13. The lock region 10 of the lower bladder ring 3 can now be moved upwards along the outer cylinder 5 and removed from the space between the outer cylinder 5 and the first lock member 13.

In this way, it is possible to readily unlock the lower bladder ring 3 and removed it from the curing machine within a minimized time, under the positive and reliable operation of the lower lock mechanism. The upper and lower bladder rings 2, 3 can be simultaneously removed from the curing machine so that the bladder 4 can be removed from the curing machine highly efficiently, within a minimized time and in a facilitated manner.

Another embodiment of the pneumatic tire curing machine according to the present invention is shown in FIGS. 6 to 9, wherein many of the elements corresponding to those in the previous embodiment are denoted by the same reference numerals plus 100, for which overlapping explanations may be omitted for the sake of simplicity. As in the previous embodiment, the curing machine according to the present embodiment also includes a center post 101, upper and lower bladder rings 102, 103 for tightly holding the bladder 104, and upper and lower lock mechanism for locking the upper and lower bladder rings 102, 103 in place. The details of the upper and lower lock mechanism will be more fully described hereinafter.

Figure 6:
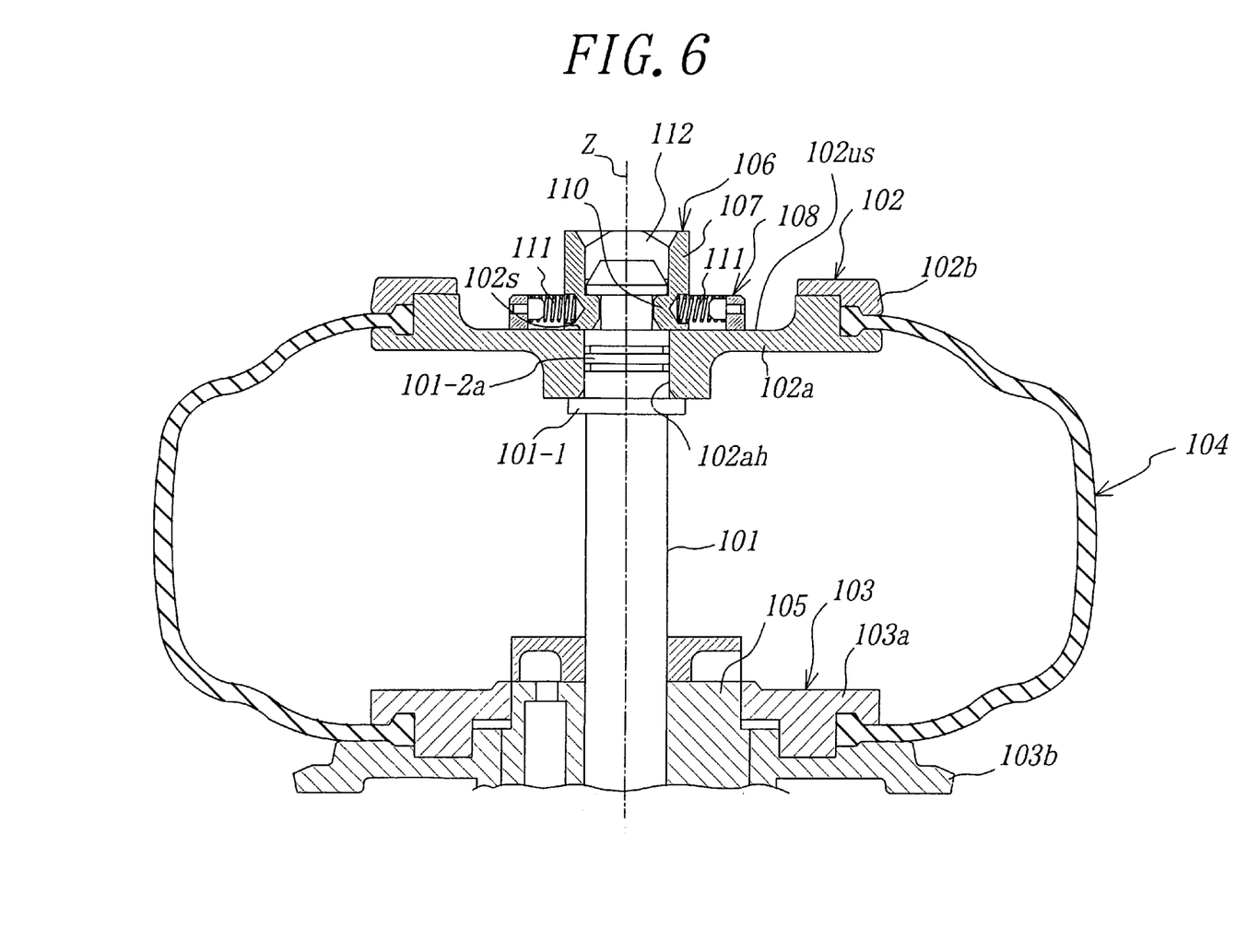
FIG. 6 is a sectional view showing the arrangement on the upper side of the center post in the curing machine according to another embodiment of the present invention.
Figure 7:
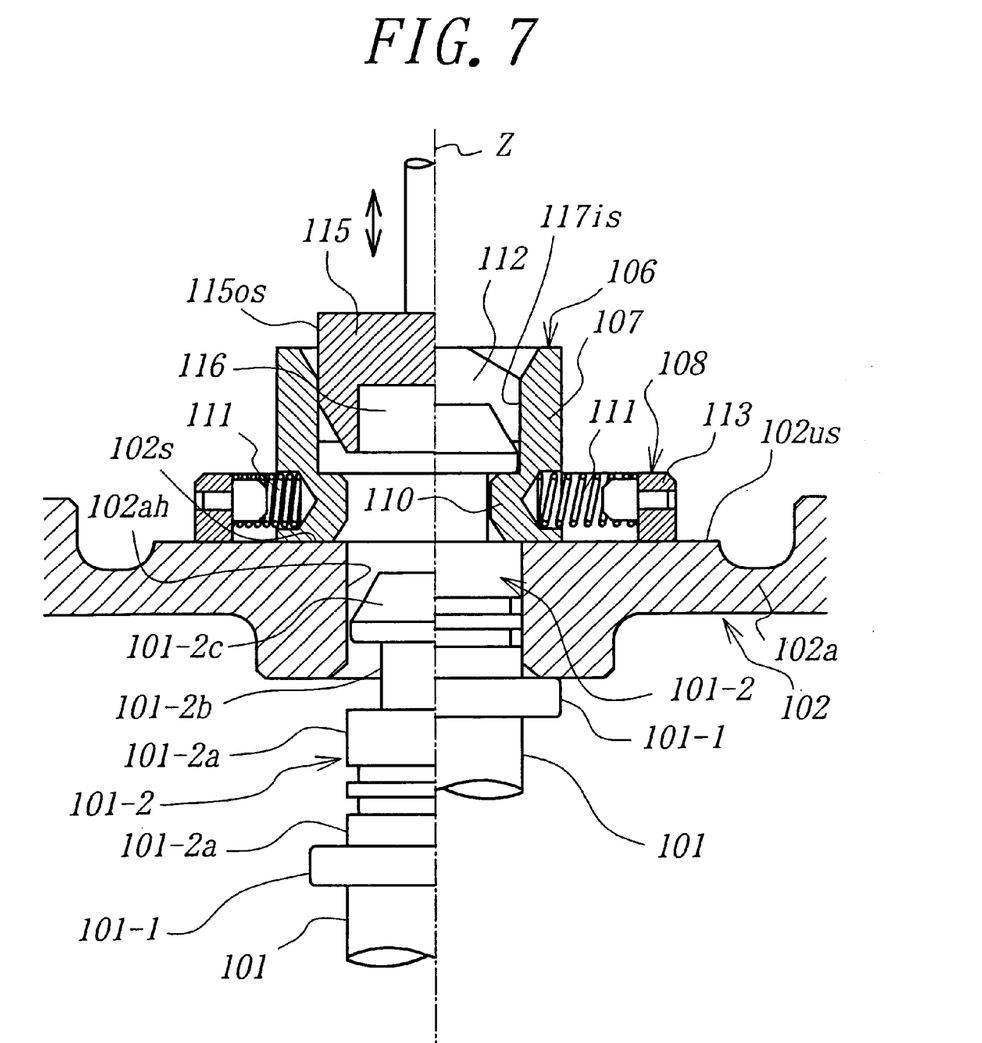
FIG. 7 is a sectional view explaining the operation of the upper lock mechanism of the curing machine of FIG. 6.

As shown in FIGS. 6 and 7, the center post 101 has a flange-like collar 101–1 at its upper portion from which the top end portion 101–2 projects upwards. The top end portion 101–2 includes a sliding region 101–2a which is in sliding contact with the inner surface of the center hole 102ah of the upper bladder ring 102, a neck region 101–2b situated on the upper side of the sliding region 101–2a and having a reduced diameter, and an enlarged head region 101–2c situated on the upper side of the neck region 101–2b and having a tapered top end. The diameter of the top end portion 101–2 of the center post 101 is designed such that the top end portion 101–2 as a whole can be moved vertically upwards and downwards, and passed through the center hole 102ah of the upper bladder ring 102.

The upper lock mechanism 106 is arranged on the upper surface 102us of the upper bladder ring 102 around the periphery of the center hole 102ah, and includes a plurality of catch member 107 in the form of arcuate segment, and resilient members 108 for normally biasing the respective catch members 107 radially inwards, i.e., toward the center axis Z of the center post 101. It is preferred that the resilient members 107 are comprised of compression coil springs 111.

The catch member 107 is provided in its lower portion with an engaging projection 110 which protrudes toward the center axis Z of the center post 101. Since the catch member 107 is normally biased by the compression coil spring 111 radially inwards, the engaging projection 110 is engageable with the lower surface of the head region 101–2c and the outer surface of the neck region 102–2b of the center post 101. When external force is applied to projection 110 of the catch member 107, the catch member 107 is moved radially outwards, thereby disengaging the projection 110 from the neck region 101–2b of the center post 101, against the biasing force of the compression coil spring 111. The inner surface of the projection on its lower side is tapered downwards and radially outwards, corresponding to the tapered top end of the head region 101–2c of the center post 101.

The catch member 107 is also provided in its upper portion with an inner space 112 which serves to accommodate the head region 101–2c of the center post 101 therein as the latter has been moved upwards. In this instance, the engaging projection 110 of the catch member 107 is engaged with the neck region 101–2c of the center post 101 and urged by the lower surface of the head region 101–2c to lock the upper bladder ring 102 with reference to the center post 101.

The catch member 107 is further provided in its outer surface with a recess which serves as a seat for the inner end of the compression coil spring 111. The outer end of the compression coil spring 111 is supported by a spring seat member 113 which projects upwards from the upper surface 102us of the upper bladder ring 102. The upper surface 102us of the upper bladder ring 102 serves as a sliding surface for the catch member 107, thereby ensuring a smooth movement of the catch member 107.

As shown in the left half of FIG. 7, the curing machine according to the present embodiment further includes un unlock member 115 which is situated immediately above the center post 101. The unlock member 115 has an outer surface 115os with a diameter which is larger than the minimum diameter circumscribed by the inner surfaces of the catch members 107 when they are locking the upper bladder ring 102. The outer surface 115os of the unlock member 115 is tapered in its lower end region downwards and radially inwards, which is engageable with the inner surface 107is of the catch member 107 as the unlock member 115 is moved downwards. When the tapered lower end region of the unlock member 115 is engaged with the inner surface 107is of the catch member 107, the catch member 107 is moved radially outwards against the biasing force of the compression coil spring 111, thereby automatically releasing the upper bladder ring 102 from the center post 101.

The inner surface 107s of the catch member 107 is tapered in its upper end region upwards and radially outwards, corresponding to the tapered lower end region of the unlock member 115. The tapered surfaces of the catch member 107 and the unlock member 115 ensure that, when the unlock member 115 is moved downwards, the catch members 107 are moved radially outwards against the biasing force of the compression coil springs 111 and the unlock member 115 is positively guided into, and received in the inner space 112 of the catch members 107. The lower end surface of the unlock member 115 is formed with a recess in which the top end of the center post 101 is partly received.

In order to firmly hold the upper bladder ring 102 by the upper lock mechanism 106, the center post 101 is moved upwards so that the top end portion 101–2 of the center post 101 is passed through the center hole 102ah in the ring element 102a. It is assumed that the unlock member 115 is maintained at its upper position in which it is vertically spaced upwards from the upper bladder ring 102. On this occasion, the tapered top end at the head region 101–2c of the center post 101 is brought into engagement with the tapered inner surfaces of the projections 110 of the catch members 107, thereby causing the catch members 107 to be moved radially outwards against the biasing force of the compression coil springs 111. As soon as the head region 101–2c of the center post 101 has passed the projections 110 of the catch members 107, the catch member 107 are moved radially inwards by the biasing force of the compression coil springs 111, and are engaged with the neck region 101–2b of the center post 101, thereby cooperating with the collar 101–1 of the center post 101 to firmly hold the upper bladder ring 102 with reference to the center post 101.

Thus, the above-mentioned unique arrangement of the upper lock mechanism 106 makes it possible readily to mount the upper bladder ring 102 onto the curing machine within a minimized time, in a highly accurately centered position, simply by moving the center post 101 upwards and thereby passing the top end portion 101–2 of the center post 101 through the center hole 102ah in the ring element 102a.

When, on the other hand, the upper bladder ring 102 is to be removed from the curing machine, the unlock member 115 is moved downwards to its lower position. On this occasion, the tapered end of the unlock member 115 is brought into engagement with the tapered ends of the catch member 107 so that the catch member 107 are moved radially outwards against the biasing force of the compression coil springs 111 and the unlock member 115 is positively guided into, and received in the inner space 112 of the catch members 107. In this instance, the top end of the center post 101 is then partly received in the recess in the lower end surface of the unlock member 115, and the projections 110 of the catch members 107 are completely disengaged from the neck region 101–2b of the center post 101. The center post 101 can be then moved downwards, thereby allowing removal of the upper bladder ring 102 from the curing machine.

Thus, the above-mentioned arrangement of the upper lock mechanism 106 in combination with the unlock member 115 makes it possible readily to remove the upper bladder ring 102 from the curing machine within a minimized time, simply by moving the unlock member 115 downwards to its lower position and successively moving the center post 101 downwards and thereby passing the top end portion 101–2 of the center post 101 through the center hole 102ah in the upper bladder ring 102.

Figure 8:
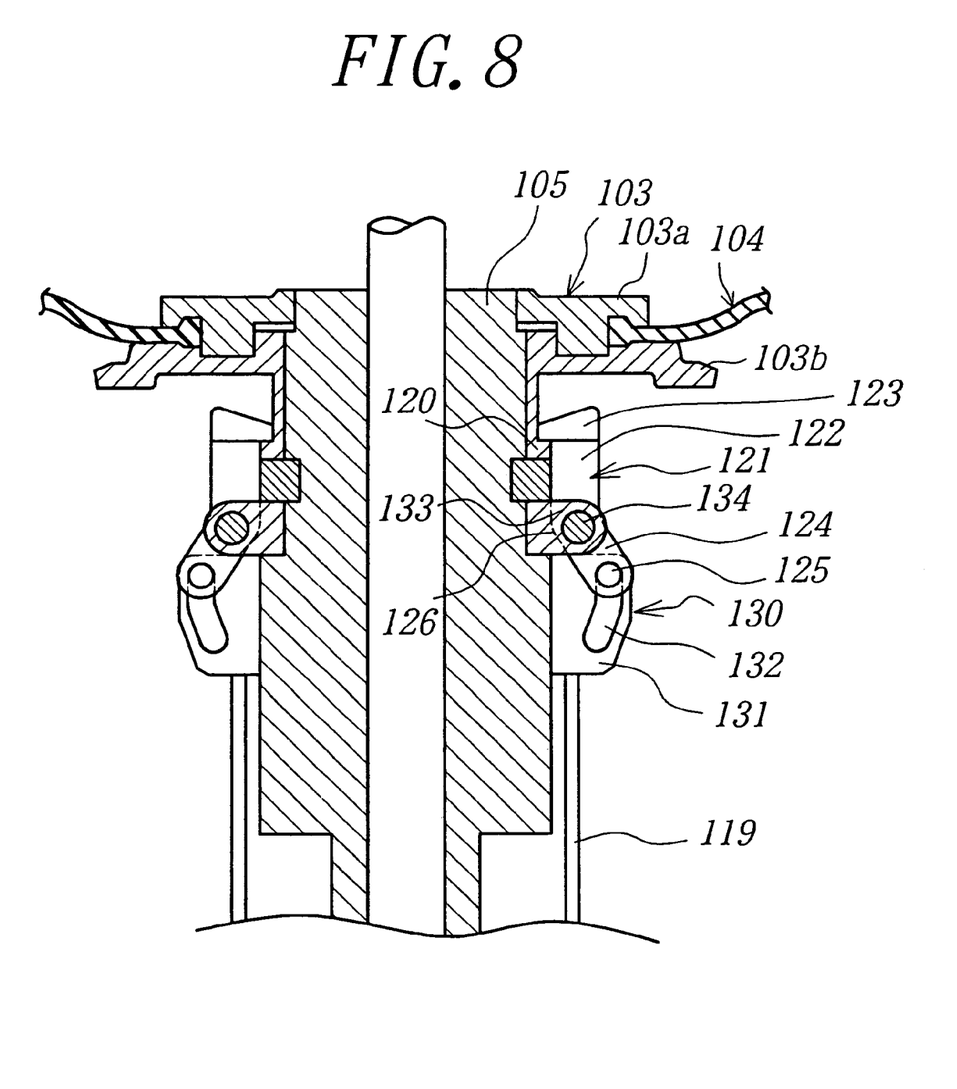
FIG. 8 is a sectional view showing the lower lock mechanism of the curing machine according to another embodiment of the present invention, wherein the lower lock mechanism assumes a locking state.
Figure 9:
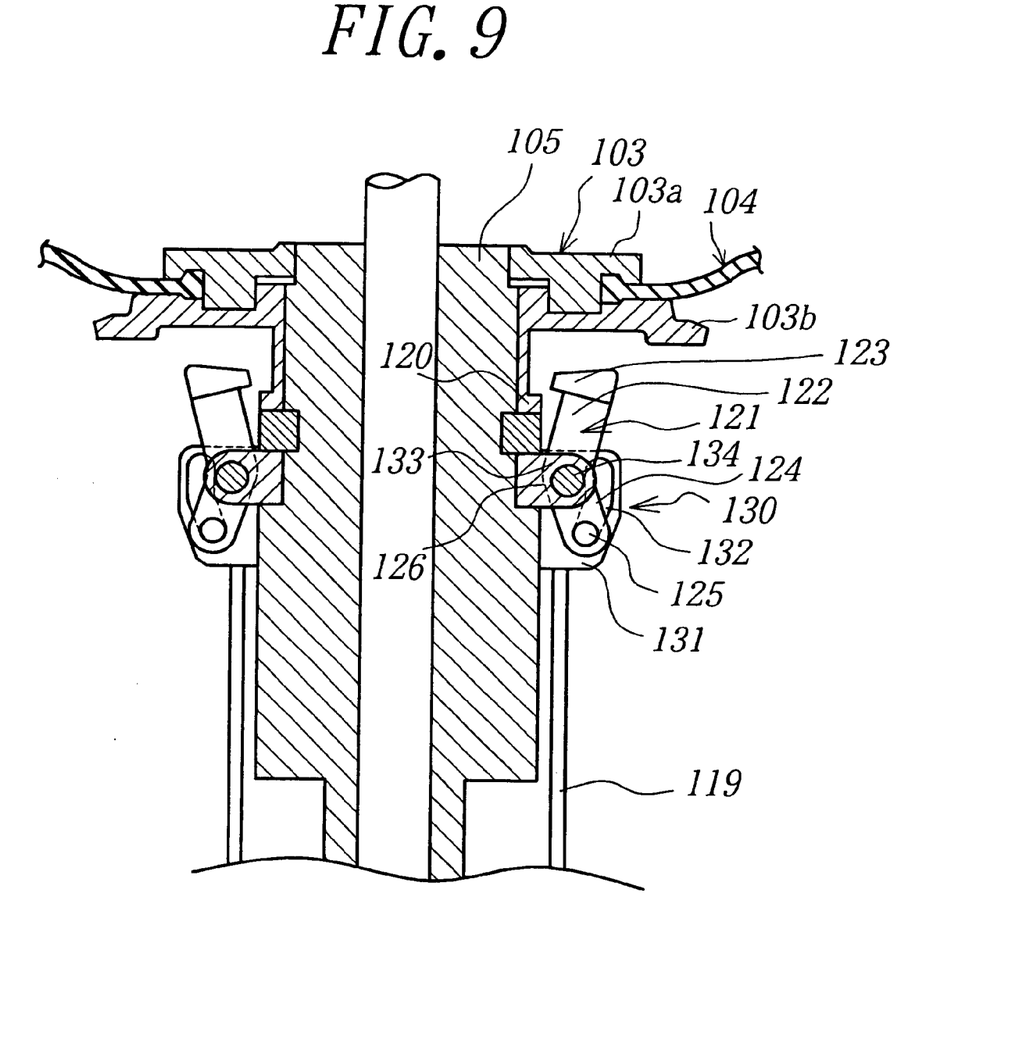
FIG. 9 is a sectional view similar to FIG. 8, but showing the lower lock mechanism in an unlocking state.

Turning to FIGS. 8 and 9, the lower ring element 103b of the lower bladder ring 103 has a center hole which is in sliding engagement with the outer cylinder 105, and a cylindrical portion extending downwards along the outer cylinder 105. The cylindrical portion of the lower ring element 103b has a lock region 120 projecting radially outwards from its outer side, where the lower bladder ring 103 is locked by the lower lock mechanism to be described below.

The lower lock mechanism includes a first lock member 121 which is comprised of a plurality of latch members 122 in the form of a bell crank. Each latch member 122 has an upper end 123 and a lower end 124. The upper end 123 of the latch member 122 is movable between a lock position in which it is in engagement with the lock region 120 of the lower bladder ring 103, and an unlock position in which it is disengaged from the lock region 120 of the lower bladder ring 103. The lower end 124 of the latch member 122 is provided with a pin 125. A shaft 126 is arranged between the upper and lower ends 123, 124 of the latch member 122, about which the latch member 122 is rotatable. The shaft 126 is supported by a support member 133 which is provided on the outer surface of the outer cylinder 105.

The lower lock mechanism further includes a second lock member 130 which is comprised of plate members 131. These plate members 131 extends vertically on the outer side of the outer cylinder 105 and are formed with slots 132 with which the pins 125 of the respective latch members 122 are in sliding engagement. The slots 132 in the plate members 131 are contoured such that the latch members 122 undergo angular movement about the respective shafts 126 when the second lock member 130 is moved vertically upwards and downwards. To this end, the second lock member 130 is connected associated with an actuator through connecting rods 119.

When the second lock member 130 assumes a lower position as shown in FIG. 8, the pin 125 at the lower end 124 of the latch member 122 is situated at the upper end of the slot 132 in the plate members 131 of the second lock member 130. In this instance, the upper end 123 of the latch member 122 is in engagement with the upper surface of the lock region 120 of the lower bladder ring 103 to firmly maintain the lower bladder ring 103 in its locked position with reference to the outer cylinder 105 of the curing machine.

When the second lock member 130 is moved upwards, from the lower position shown in FIG. 8 to the upper position shown in FIG. 9, the pin 125 of the latch member 122 is guided along the slot 132 until it comes into abutment with the lower end of the slot 132. During this movement, the latch members 122 undergo angular movement about the respective shafts 126 so that their upper ends are disengaged from the lock region 120 of the lower bladder ring 103. In this instance, the lower bladder ring 103 is unlocked and can be removed from the curing machine.

In this way, it is possible to readily unlock the lower bladder ring 103 and remove it from the curing machine within a minimized time, under the positive and reliable operation of the lower lock mechanism. The upper and lower bladder rings 102, 103 can be simultaneously removed from the curing machine so that the bladder 104 can be removed from the curing machine highly efficiently, within a minimized time and in a facilitated manner.

Subsequently, with the lower lock mechanism maintained in its unlock position, the lock region 120 of a new lower bladder ring 103 is moved downwards along the outer cylinder 5. The second lock member 103 is then moved downwards to the lower position shown in FIG. 8 so that the latch members 122 of the first lock member 121 are moved to undergo angular movement about the respective shafts 126 until the upper ends of the latch members 122 are brought into engagement with the lock region 120 of the lower bladder ring 103, thereby maintaining the lower bladder ring 103 in its locked position with reference to the outer cylinder 105 of the curing machine.

In this way, it is possible to readily mount the lower bladder ring 103 onto the curing machine within a minimized time, and firmly hold the lower bladder ring 103 in a highly accurately centered position by the lower lock mechanism. The upper and lower bladder rings 102, 103 can be simultaneously mounted onto the curing machine and are locked in place automatically. Therefore, the bladder 104 can be mounted onto the curing machine highly efficiently, within a minimized time and in a facilitated manner.

It will be appreciated that the present invention provides an improved curing machine wherein the exchange of the bladders can be performed highly efficiently, in a simplified manner and within a minimized time.

While the present invention has been described above with reference to specific embodiments, it is needless to say that various changes and/or modifications are possible without departing from the scope of the invention. Thus, for example, the upper lock mechanism according to the first embodiment may be combined with the lower lock mechanism according to the second embodiment. Likewise, the upper lock mechanism according to the second embodiment may be combined with the lower lock mechanism according to the first embodiment.

What is claimed is:

1. A curing machine for pneumatic tires, comprising:
   a bladder for heating and pressurizing a green tire from its inner side;
   upper and lower bladder rings for holding the bladder in air-tight manner;
   a vertically movable center post for holding said upper bladder ring;
   an outer cylinder arranged on a radially outer side of the center post, for supplying a pressurized heat medium into an interior of the green tire; and
   a lower lock mechanism for locking the lower bladder ring to the outer cylinder, said lower lock mechanism comprising:
   (i) a lock region extending downwards from the lower bladder ring;
   (ii) a first lock means secured to an outer side of the outer cylinder; and
   (iii) a second lock means which can be vertically moved on an outer side of the first lock means so that the first lock means is engaged with the lock region of the lower bladder ring and locked with each other by vertically moving the second lock means in a predetermined direction, and unlocked from each other by vertically moving the second lock means in the opposite direction.

2. The curing machine according to claim 1, wherein the lower lock mechanism comprises:
   (i) a first recess in an outer surface of the lock region of the lower bladder ring;
   (ii) a second recess in an inner surface of the second lock means;
   (iii) a through hole extending through the first lock means such that the through hole can be selectively aligned with the first and second recesses;
   (iv) a movable lock element retained in the through hole of the first lock means and selectively engageable with the first and second recesses so that the lock region of the lower bladder ring is locked with the first lock means when the lock element is engaged into the first recess and disengaged from the second recess, and unlocked from the first lock means when the lock element is disengaged from the first recess and engaged into the second recess.

3. The curing machine according to claim 2, wherein said lock element is in contact with the inner surface of the second lock means when the lock element is engaged into the first recess and disengaged from the second recess, and in contact with the outer surface of the lock region of the lower bladder ring when the lock element is disengaged from the first recess and engaged into the second recess.

4. The curing machine according to claim 2, wherein said through hole in the first lock means has a bottom surface which is inclined vertically downwards and radially outwards so that the lock element is automatically moved out of the first recess into the second recess when the second lock means is vertically moved in a predetermined direction to unlock the lock region of the lower bladder ring from the first lock means, and is automatically moved out of the second recess into the first recess when the second lock means is vertically moved in the opposite direction to lock the lock region of the lower bladder ring with the first lock means.

5. The curing machine according to claim 2, wherein said movable lock element retained in the through hole of the first lock means comprises a ball.

6. The curing machine according to claim 1, wherein the lower bladder ring comprises a cylindrical portion extending along the outer cylinder, and said lock region of the lower bladder ring projects radially outwards from the cylindrical portion, wherein said first lock means comprises a plurality of latch members which are movable between a lock position in which they are in locking engagement with the lock region of the lower bladder ring, and an unlock position in which they are disengaged from the lock region of the lower bladder ring, and wherein said second lock means causes said latch members of the first lock means to be moved between the lock position and the unlock position.

7. The curing machine according to claim 6, wherein, said latch members of the first lock means are in the form of bell crank having a first end which can be engaged with, and disengaged from said lock region of the lower bladder ring, and a second end which is engaged with, and driven by said second lock means.

8. The curing machine according to claim 7, wherein said second lock means comprises plate members formed with slots, and said latch members of the first lock means are provided with pins which are guided by said slots of the plate members, said slots being configured so that said latch members of the first lock means are moved between the lock position and the unlock position as said plate members of the second lock means are moved vertically upwards and downwards and said pins of the latch members are moved along the slots in the plate members.

9. The curing machine according to claim 1, wherein the first lock means is located below the bladder ring.

10. The curing machine according to claim 1, wherein the lower lock mechanism only engages the lower bladder ring.

11. A curing machine for pneumatic tires, comprising:

a bladder for heating and pressurizing a green tire from its inner side;

upper and lower bladder rings for holding the bladder in air-tight manner, said upper bladder ring having a center through hole;

a vertically movable center post for holding said upper bladder ring, said center post having a top end portion which can be passed through said center through hole in the upper bladder ring;

an outer cylinder arranged on a radially outer side of the center post, for supplying a pressurized heat medium into an interior of the green tire;

an upper lock mechanism located at the top end portion of the center post for automatically locking the upper bladder ring to the center post after the top end portion of the center post has been passed through the center hole in the upper bladder ring; and a lower lock mechanism for locking the lower bladder ring to the outer cylinder, said lower lock mechanism comprising:

(i) a lock region extending downwards from the lower bladder ring;

(ii) a first lock means secured to an outer side of the outer cylinder; and (iii) a second lock means which can be vertically moved on an outer side of the first lock means so that the first lock means is engaged with the lock region of the lower bladder ring and locked with each other by vertically moving the second lock means in a predetermined direction, and unlocked from each other by vertically moving the second lock means in opposite direction.

12. The curing machine according to claim 11, wherein said upper lock mechanism is associated with a supporting portion for supporting the lower surface of the upper bladder ring, said supporting portion being provided at the top end portion of the center post.

13. The curing machine according to claim 11, wherein said upper lock mechanism comprises urging means which normally assumes a radially expanded state toward its lower end so as to cooperate with said supporting portion and urge the upper surface of the upper bladder ring.

14. The curing machine according to claim 13, wherein said urging means comprises a plurality of swing arms which are pivotally connected to the top end portion of the center post at their respective pivot axes, and resilient means for resiliently biasing the swing arms about their respective axes so that lower ends of the swing arms are spread radially outwards.

15. The curing machine according to claim 13, further comprising a vertically movable unlock member which is provided above the top end portion of the center post, said unlock member having an inner space which is adapted to accommodate at least an upper portion of the urging means so that the lock means is retracted radially inwards thereby allowing the upper lock mechanism to be passed through the center through hole in the upper bladder ring.

16. The curing machine according to claim 11, wherein the top end portion of the center post comprises an enlarged head region and a neck region with a reduced diameter, and said upper lock mechanism comprises a plurality of catch members each having a projection engageable with said head region of the center post as it is being moved upwards and with the neck region of the center post after the top end portion has passed through the center through hole in the upper bladder ring.

17. The curing machine according to claim 16, wherein said catch members are in the form of arcuate segments which are arranged about the center through hole in the upper bladder ring.

18. The curing machine according to claim 16, wherein the upper lock mechanism further comprises resilient members for normally biasing the catch members radially inwards such that the projections of the catch members are maintained in engagement with the neck region of the center post to hold the upper bladder ring in place with reference to the center post.

19. The curing machine according to claim 18, wherein each of said catch members has a lower surface which is in sliding engagement with the upper surface of the upper bladder ring, and each of said resilient members has an inner end and an outer end, of which the inner end is engaged with the catch member and the outer end is supported by the upper bladder ring.

20. The curing machine according to claim 16, further comprising a vertically movable unlock member which is provided above the top end portion of the center post, said unlock member having an outer diameter which is larger than the minimum diameter circumscribed by the catch members when the projections of the catch members are engaged with the neck region at the top end portion of the center post, so that the downward movement of the unlock member causes the catch members to be moved radially outwards and the projections to be disengaged from the neck region of the center post.

21. The curing machine according to claim 11, wherein the lower lock mechanism comprises:

(i) a first recess in an outer surface of the lock region of the lower bladder ring;

(ii) a second recess in an inner surface of the second lock means;

(iii) a through hole extending through the first lock means such that the through hole can be selectively aligned with the first and second recesses;

(iv) a movable lock element retained in the through hole of the first lock means and selectively engageable with the first and second recesses so that the lock region of the lower bladder ring is locked with the first lock means when the lock element is engaged into the first recess and disengaged from the second recess, and unlocked from the first lock means when the lock element is disengaged from the first recess and engaged into the second recess.

22. The curing machine according to claim 21, wherein said lock element is in contact with the inner surface of the second lock means when the lock element is engaged into the first recess and disengaged from the second recess, and in contact with the outer surface of the lock region of the lower bladder ring when the lock element is disengaged from the first recess and engaged into the second recess.

23. The curing machine according to claim 21 or 22, wherein said through hole in the first lock means has a bottom surface which is inclined vertically downwards and radially outwards so that the lock element is automatically moved out of the first recess into the second recess when the second lock means is vertically moved in a predetermined direction to unlock the lock region of the lower bladder ring from the first lock means, and is automatically moved out of the second recess into the first recess when the second lock means is vertically moved in the opposite direction to lock the lock region of the lower bladder ring with the first lock means.

24. The curing machine according to claim 21, wherein said movable lock element retained in the through hole of the first lock means comprises a ball.

25. The curing machine according to claim 11, wherein the lower bladder ring comprises a cylindrical portion extending along the outer cylinder, and said lock region of the lower bladder ring projects radially outwards from the cylindrical portion, wherein said first lock means comprises a plurality of latch members which are movable between a lock position in which they are in locking engagement with the lock region of the lower bladder ring, and an unlock position in which they are disengaged from the lock region of the lower bladder ring, and wherein said second lock means causes said latch members of the first lock means to be moved between the lock position and the unlock position.

26. The curing machine according to claim 25, wherein said latch members of the first lock means are in the form of bell crank having a first end which can be engaged with, and disengaged from said lock region of the lower bladder ring, and a second end which is engaged with, and driven by said second lock means.

27. The curing machine according to claim 26, wherein said second lock means comprises plate members formed with slots, and said latch members of the first lock means are provided with pins which are guided by said slots of the plate members, said slots being configured so that said latch members of the first lock means are moved between the lock position and the unlock position as said plate members of the second lock means are moved vertically upwards and downwards and said pins of the latch members are moved along the slots in the plate members.

28. The curing machine according to claim 11, wherein the first lock means is located below the lower bladder ring.

29. The curing machine according to claim 11, wherein the lower lock mechanism only engages the lower bladder ring.

* * * * *